Nov. 2, 1937.        R. C. ELLIS        2,097,872
COMBINED INSTRUMENT PANEL AND RADIO RECEIVER

Filed March 11, 1933

INVENTOR-
RAY C. ELLIS
BY
ATTORNEY-

Patented Nov. 2, 1937

2,097,872

UNITED STATES PATENT OFFICE 2,097,872

COMBINED INSTRUMENT PANEL AND RADIO RECEIVER

Ray C. Ellis, Detroit, Mich., assignor to Radio Corporation of America, a corporation of Delaware Application March 11, 1933, Serial No. 660,353

2 Claims. (Cl. 250—14)

The present invention relates generally to radio receiver mountings and more particularly to a system for mounting a receiver on motor vehicles such as motor cars, aircraft, boats and the like.

One object of the present invention is to provide portable apparatus such as a receiving set in the form of an installation in vehicles or the like wherein the apparatus is located conveniently for operation and wherein the construction, location and arrangement of the various parts of the radio apparatus permit of easy removability and afford a high degree of efficiency in the operation of the set without marring the appearance of the vehicle or in any way interfering with the ease and convenience of manipulating the various vehicle mechanisms and devices.

Another object of the invention is to provide an installation of the character described wherein the receiver is mounted between the instrument panel and the dash board of a vehicle.

Another object of the invention is to provide an installation of the character described wherein the instrument panel is provided with an opening which forms a loudspeaker grille, the loudspeaker being mounted directly in back thereof.

Still another object of the invention is to mount the loudspeaker of a radio receiver directly behind an opening provided in the instrument panel of the vehicle and so as to have the instrument panel act as a baffle for the speaker.

Figure 1:
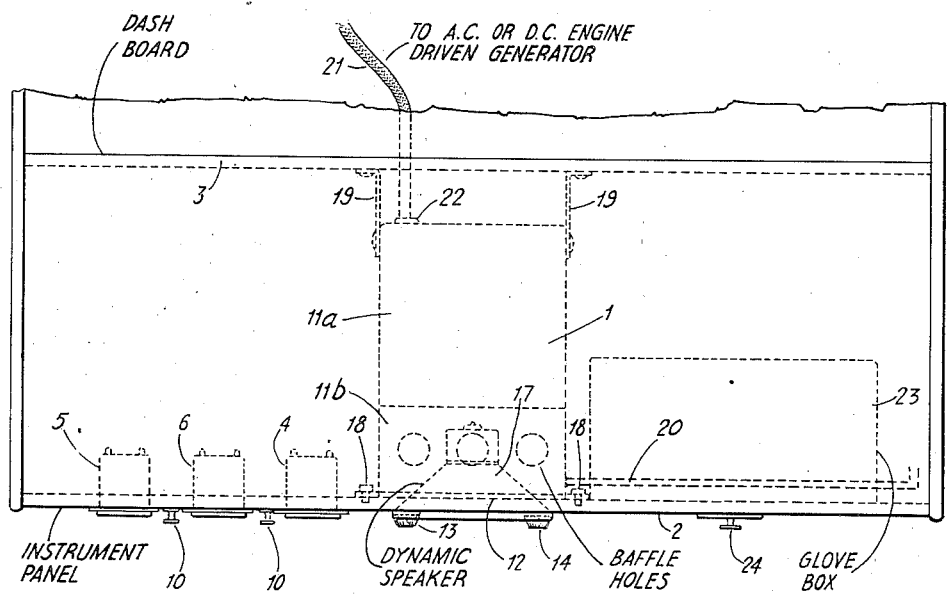
Figure 2:
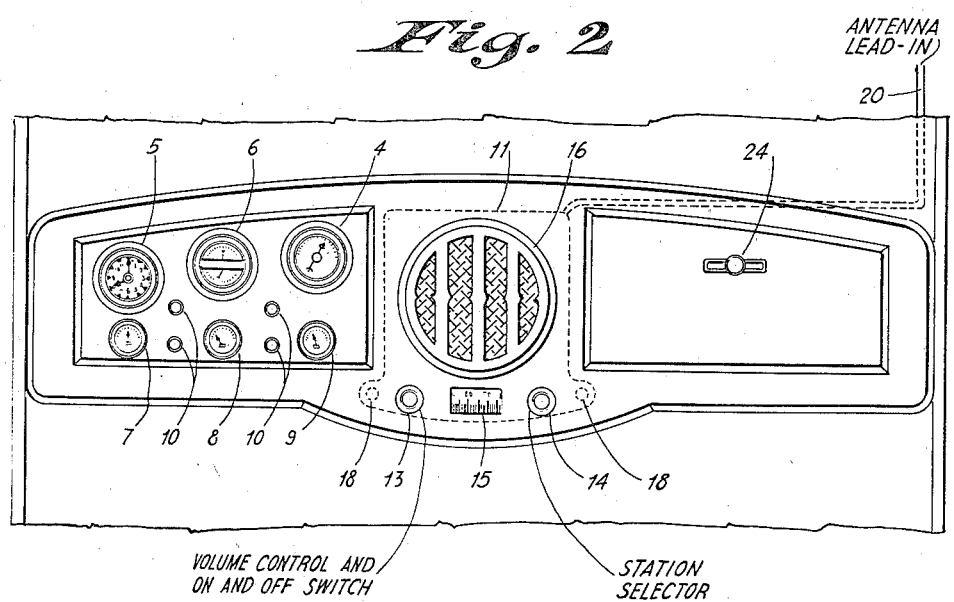

Other objects of the invention will be obvious from the following description and claims when read in connection with the drawing, in which, Fig. 1 is a top view of the portion of a vehicle between the instrument panel and dash board; and, Fig. 2 is a front elevational view of the instrument panel with a radio set mounted in accordance with the present invention.

Referring to the drawing, the improved portable radio apparatus comprises a radio receiving set indicated generally as 1, mounted between the instrument panel 2 and dash board 3 in front of the pilot's seat. The instrument panel may be arranged to carry the various operating accessories of the vehicle, such as, speedometer 4, clock 5, combination meter 6 and various other instruments indicated generally as 7, 8, 9 together with various operating levers 10. The receiving set 1 is shown housed in a casing preferably composed of two compartments 11a and 11b. Compartment 11b is used for housing the speaker 17 in the particular embodiment shown. This chamber is provided with baffle holes as indicated in Figure 1. The baffle holes are necessary in the particular arrangement shown in Figure 1 for the reason that if the space behind the diaphragm 17 of the loudspeaker is completely enclosed air will furnish an elastic restoring force to the diaphragm causing a strong resonance effect which greatly reduces the amplitude of vibration of the diaphragm thus causing distortion. It is known in the acoustical art that certain difficulties may arise in the operation of loudspeakers due to combining actions between the waves formed at the back of a diaphragm and the front of a diaphragm. To prevent this it has been customary to utilize what is known in the art as a baffle. The baffle provides a properly damped chamber back of the diaphragm thus decreasing any distorting action due to the above combination of waves and at the same time increasing the sound radiation from the diaphragm. In the present instance, the loudspeaker is arranged with respect to the instrument panel so that the latter acts as a baffle for the speaker. When the instrument panel takes the form of a substantially plane surface the baffle effect is usually most desirable. It is to be understood, however, that the baffle need not necessarily be a plane surface in order to be effective as a baffle. A control panel 12 is mounted on the instrument panel 2 so that the operating knobs 13 and 14 protrude through suitable openings in instrument panel 2 and are within easy reach of the pilot. The usual station indicating dial arrangement 15 is arranged so as to be visible to the pilot through a suitable opening in panel 2. It should be particularly noticed that the present invention provides a loudspeaker grille 16 adapted to be formed on the instrument panel directly in back of which is mounted the loudspeaker 17. The loudspeaker 17 and radio apparatus indicated generally as 1 is preferably mounted on a single chassis so as to permit simultaneous removal of both. One end of the radio chassis is mounted on the instrument panel as shown by suitable means such as bolts 18, 18. The other end is mounted in suitable fashion as by brackets 19, 19 to the dash board. An antenna lead-in wire 20 may be suitably mounted within the vehicle body in any desired fashion, this antenna lead entering the receiver as shown. The radio apparatus chassis including the loudspeaker is constructed so as to permit easy removal of the unit for purposes of inspection or the like. For this purpose the bolts 18, 18 and the attachments for the brackets 19, 19 are removable and the receiver and loudspeaker may be dropped from its mounting to the floor of the vehicle through the usual space provided between the instrument panel, and the dash board.

For linking the terminals of the receiving set with the terminals of the power sources such as the connection to the A. C. or D. C. engine driven generator or a suitable battery there is provided a cable 21 which is so constructed that it does not interfere with the removal of the radio receiver. This construction comprises the plug-in arrangement 22 which may be removed when it is desired to remove the receiver from its mounting. The plug-in 22 is provided with a suitable number of jack connections which cooperate with a suitable plug receptacle in the receiver. The instrument panel is provided with a glove box 23 which is mounted directly behind the instrument panel to one side of the radio receiver. Glove box 23 is provided with a door operated by means of suitable knob 24.

It is obvious, of course, that various other embodiments may be made of the above invention and that various changes might be made in the embodiment above set forth. Consequently, it is to be understood that all matters herein set forth or shown in the accompanying drawing are to be interpreted as illustrative and not in any sense as limiting.

I claim:

1. In combination with an instrument panel of a vehicle, radio apparatus comprising a radio receiver including a casing adapted to be mounted directly behind the panel through means arranged so as to permit removal of the receiver, a cable provided with a plug-in device adapted to cooperate with a plug receptacle in the receiver for connecting the radio receiver to a source of power so as to be energized thereby, a loudspeaker mounted on the receiver chassis and arranged directly in back of the instrument panel and a loudspeaker grille formed on the instrument panel and arranged so as to register with the loudspeaker, said panel forming a baffle plate for the loudspeaker.

2. In combination with an instrument panel of a motor vehicle, radio apparatus comprising a radio receiver and a loud speaker, a housing for the receiver and loud speaker, said receiver being mounted within said housing so that the tuning dial and operating controls of the radio receiver are exposed, said loud speaker being mounted within said housing so that the sound emitting surface of the loud speaker is exposed, said housing being provided with means so as to be mounted directly behind the instrument panel of the motor vehicle, means including a plug-in device for connecting the receiver to an energizing source, a loud speaker opening through the instrument panel, said housing being mounted directly in back of the instrument panel and so that the exposed sound emitting surface of the loud speaker registers with the opening, said panel forming an effective baffle for the loud speaker.

RAY C. ELLIS.